United States Patent [19]

Graves et al.

[11] Patent Number: 5,029,333

[45] Date of Patent: Jul. 2, 1991

[54] COMMUNICATIONS SYSTEM

[75] Inventors: Alan F. Graves, Kanata; Valerie A. Van Alstine; Barry B. Hagglund, both of Nepean, all of Canada

[73] Assignee: Northern Telecom Limited, Montreal, Canada

[21] Appl. No.: 447,316

[22] Filed: Dec. 7, 1989

[51] Int. Cl.[5] ............................................. H04J 3/12
[52] U.S. Cl. ................................ 370/58.1; 370/110.1
[58] Field of Search ...................... 370/58.1, 3, 110.1, 370/77

[56] References Cited

U.S. PATENT DOCUMENTS

| | | | |
|---|---|---|---|
| 4,789,981 | 12/1988 | Yanosy, Jr. et al. | 370/110.1 |
| 4,794,595 | 12/1988 | Ohyama | 370/110.1 |
| 4,811,335 | 3/1989 | van Baardwijk | 370/58.1 |
| 4,922,490 | 5/1990 | Blakley | 370/110.1 |

Primary Examiner—Douglas W. Olms
Assistant Examiner—Melvin Marcelo
Attorney, Agent, or Firm—R. John Haley

[57] ABSTRACT

A double-star communications system comprises a digital terminal, active pedestals coupled to the digital terminal via optical fibers, and subscribers' premises coupled to each active pedestal via existing telephone lines and via additional communications paths, which may comprise optical fibers or coaxial calbes. The digital terminal multiplexes broadband signal components, such as video channels, selected in response to subscriber control signals, with a multiplexed telephony signal and transmits these optically to an active pedestal, and receives the control signals, a multiplexed telephony signal, and optional upstream broadband signal components from the active pedestal. The active pedestal transmits and receives the signals on the first communications path, and demultiplexes the received multiplexed telephony signal and the broadband signal components. The received and tranmitted telephony signals are coupled to and from the telephone lines for providing telephone communications, and the selected broadband signal components are coupled to the additional communications paths. The active pedestal forwards to the digital terminal the control signals received from the subscriber via the additional communications paths, optionally multiplexed with an upstream broadband signal component.

12 Claims, 4 Drawing Sheets

Fig. 1

PRIOR ART

COMMUNICATIONS SYSTEM

This invention relates to communications systems, and is particularly concerned with a communications system for providing both telephone and broadband, e.g. video, communications for subscribers.

Telephone communications for subscribers have for a long time been provided via two-wire telephone subscriber lines, which generally extend from a telephone central office to each subscriber's premises in a star arrangement. For communications among central offices and at higher communications speeds, it is increasingly common for optical fiber communications paths to be used in view of the well-known advantages which such paths provide. It is desirable to extend such optical fiber paths to the subscribers, but it is not economically feasible to replace the existing wire subscriber lines.

As an intermediate but still desirable step in extending optical fiber paths to subscribers' premises, it is known to provide a double-star arrangement with active pedestals. In such an arrangement, active pedestals (i.e. pedestals containing powered electronic equipment) are provided each relatively close to a group of subscribers' premises, for example within a distance of a few hundred meters, and the two-wire subscriber lines extend from the pedestal to the subscribers' premises. Between each pedestal and the central office, or a remote digital terminal providing an equivalent function, a multiplexed communications path, which can be an optical fiber path, is provided for bidirectional telephone communications. Such optical communications are desirably effected in conformance with the SONET standard which is known in itself.

While such an arrangement is advantageous, it only provides for telephone or narrowband communications for each subscriber. It is becoming increasingly desirable for communications facilities to provide not only such narrowband services, but also broadband services such as broadcast digital television channels and video-on-demand services. Each such channel may require a bandwidth of the order of 50 Mb/s, or much more for high-definition television (HDTV) channels.

In order to provide both telephone communications and broadcast television channels for residential subscribers, it is also known to provide an optical fiber communications path between a telephone central office and each subscriber's premises, and to multiplex the telephone and television signals on the fiber. While such an arrangement may be convenient for new residences in which communications facilities are being initially installed, it is not conveniently and economically applicable to existing residences which already have conventional facilities (e.g. two-wire telephone subscriber lines and coaxial cable for broadcast television channels) installed, because such conventional facilities are replaced and made redundant by the optical fiber communications path.

An object of this invention, therefore, is to provide an improved communications system in which both narrowband telephone and broadband video services can be provided in an economical and convenient manner.

According to one aspect of this invention there is provided a communications system comprising: coupling means for coupling telephony signals to and from a plurality of telephone subscriber lines for providing telephone communications via the lines; means for receiving a multiplexed signal including multiplexed telephony signals and a broadband signal; means for supplying the multiplexed received telephony signals to the coupling means for the telephone communications; means for coupling components of the broadband signal to a plurality of communications paths for delivery of the components to respective subscribers; and means for receiving control signals from the subscribers and for selecting the components in dependence upon the control signals.

Preferably the means for supplying the multiplexed received telephony signals to the coupling means and the means for coupling components of the broadband signal comprise an optical communications path.

In accordance with another aspect of this invention there is provided a communications system comprising a digital terminal, at least one active pedestal coupled to the digital terminal via a first, bidirectional, communications path, and at least one subscriber's premises coupled to the active pedestal via a telephone line and via a second communications path; the digital terminal comprising: means for multiplexing a plurality of broadband signal components with a multiplexed telephony signal and for transmitting the resulting multiplexed signal via the first communications path to the active pedestal; means for receiving a multiplexed telephony signal and control signals via the first communications path from the active pedestal; and means for selecting the broadband signal components in dependence upon the control signals; and the active pedestal comprising: means for receiving and demultiplexing the multiplexed signal from the first communications path; means for receiving control signals from the subscriber; means for transmitting multiplexed telephony signals and the control signals via the first communications path; coupling means for coupling the received and transmitted telephony signals to and from the telephone line for providing telephone communications via the line; and means for coupling the broadband signal components to the second communications path.

In this case preferably the means for receiving control signals from the subscriber comprises means for receiving the control signals via the second communications path, and the first and second communications paths preferably comprise optical communications paths.

The active pedestal can further include means for receiving a broadband signal component via the second communications path and means for supplying the received broadband signal component to the means for coupling broadband signal components to the second communications path. The means for receiving control signals from the subscriber can be responsive to the control signals for controlling the means for coupling the broadband signal components to the second communications path to couple to the second communications path the broadband signal component received via the second communications path. This enables a broadband signal, for example a video channel, which originates in a subscriber's premises to be easily distributed throughout that subscriber's premises.

The invention will be further understood from the following description with reference to the accompanying drawings, in which similar references are used in different figures to denote similar components and in which.

Figure 1:
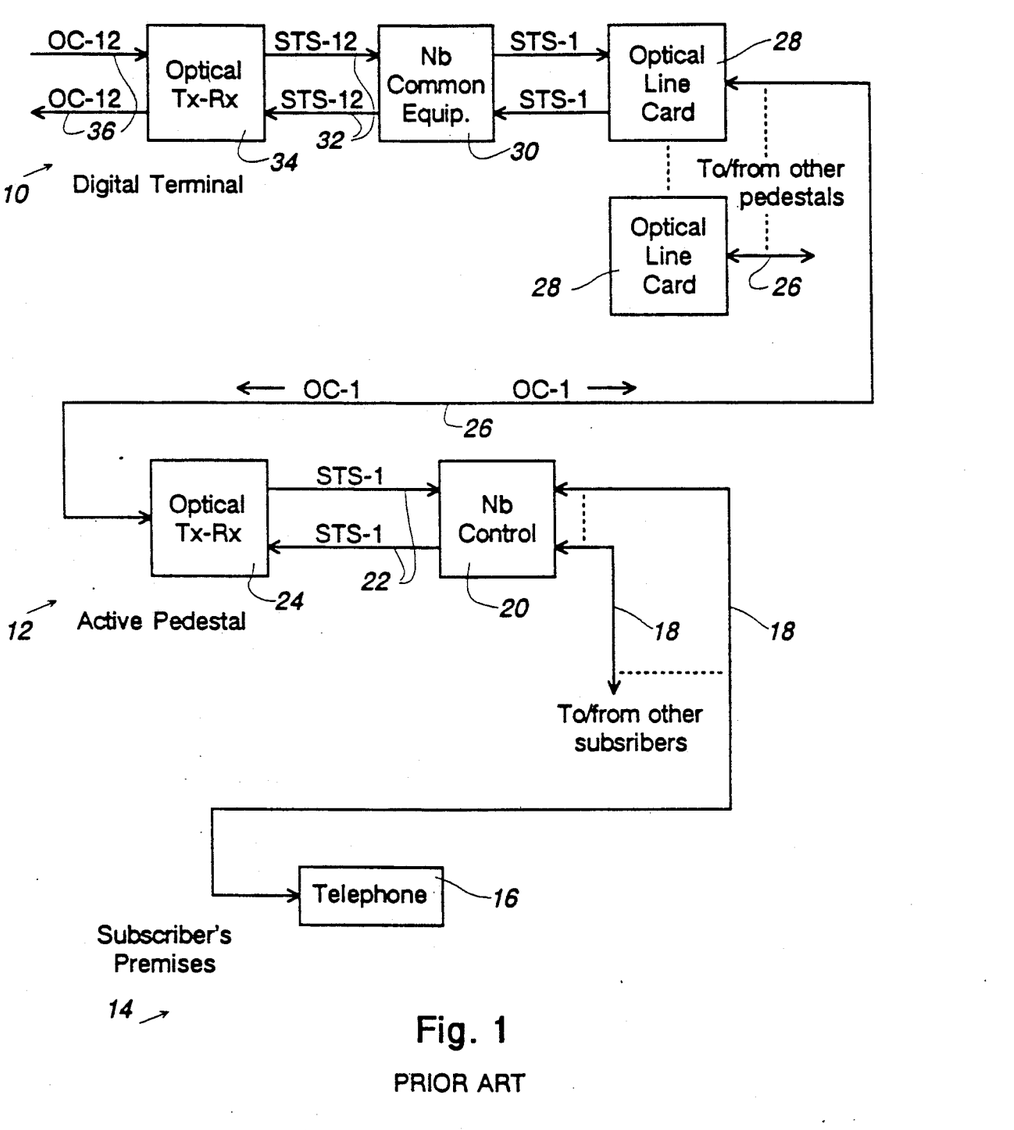
FIG. 1 is a block diagram illustrating a known form of communications system.

Referring to FIG. 1, there is illustrated a known form of communications system, or residential fiber access network, comprising equipment at a digital terminal 10, an active pedestal 12, and a subscriber's premises 14. For simplicity, FIG. 1 only shows one active pedestal 12, although many, for example 30, may be provided and connected in the same manner to the digital terminal 10. Similarly, FIG. 1 shows only one subscriber's premises 14, although several, for example 8, may be connected in the same manner to each active pedestal 12. Thus the digital terminal 10 can serve up to, for example, 240 subscribers.

The subscriber's premises equipment in FIG. 1 comprises a conventional telephone 16, which is connected to a conventional two-wire telephone subscriber line 18 and thence to a narrowband (Nb) control and line interface circuit 20 in the active pedestal 12. The circuit 20 serves to provide conventional facilities for each telephone subscriber line 18, and to convert in known manner between the conventional telephony signals on the lines 18 and SONET STS-1 digital signals on lines 22. As is well known in the art, a SONET STS-1 signal is an electrical signal having a prescribed form and a bit rate of 51.84 Mb/s; a SONET OC-1 signal is a directly equivalent optical signal. As is also well known, byte-interleaved multiples of an STS-1 signal are referred to as STS-n signals where n is an integer multiplier, and equivalent optical signals are referred to as OC-n signals.

The active pedestal 12 also includes an optical transmitter and receiver (Tx-Rx) 24 which transmits and receives via an optical fiber 26, for example using wave division multiplexing (WDM), OC-1 optical signals corresponding to the STS-1 signals on the lines 22.

In the digital terminal 10, each fiber 26 is coupled to a respective optical line card 28, which communicates the respective STS-1 signals with a narrowband common equipment circuit 30. The circuit 30 provides interfacing, switching, grooming, and concentration functions for these STS-1 signals with respect to STS-12 signals on lines 32. The digital terminal also includes an optical transmitter and receiver 34 which communicates OC-12 optical signals, corresponding to the STS-12 signals on the lines 32, via respective optical fibers 36 with a telephone central office (not shown).

The digital terminal 10 can be located with the central office or remotely from it. Each active pedestal 12 can be located up to about 6 km from the digital terminal, and is conveniently less than about 250 m from each associated subscriber's premises 14. This arrangement of equipment is referred to as a double star arrangement with an active pedestal, the pedestal 12 containing active components for which power supply is required. Power may be supplied to the pedestal 12 from the digital terminal 10 via wires (not shown), and the pedestal may include a back-up power supply.

Figure 2:
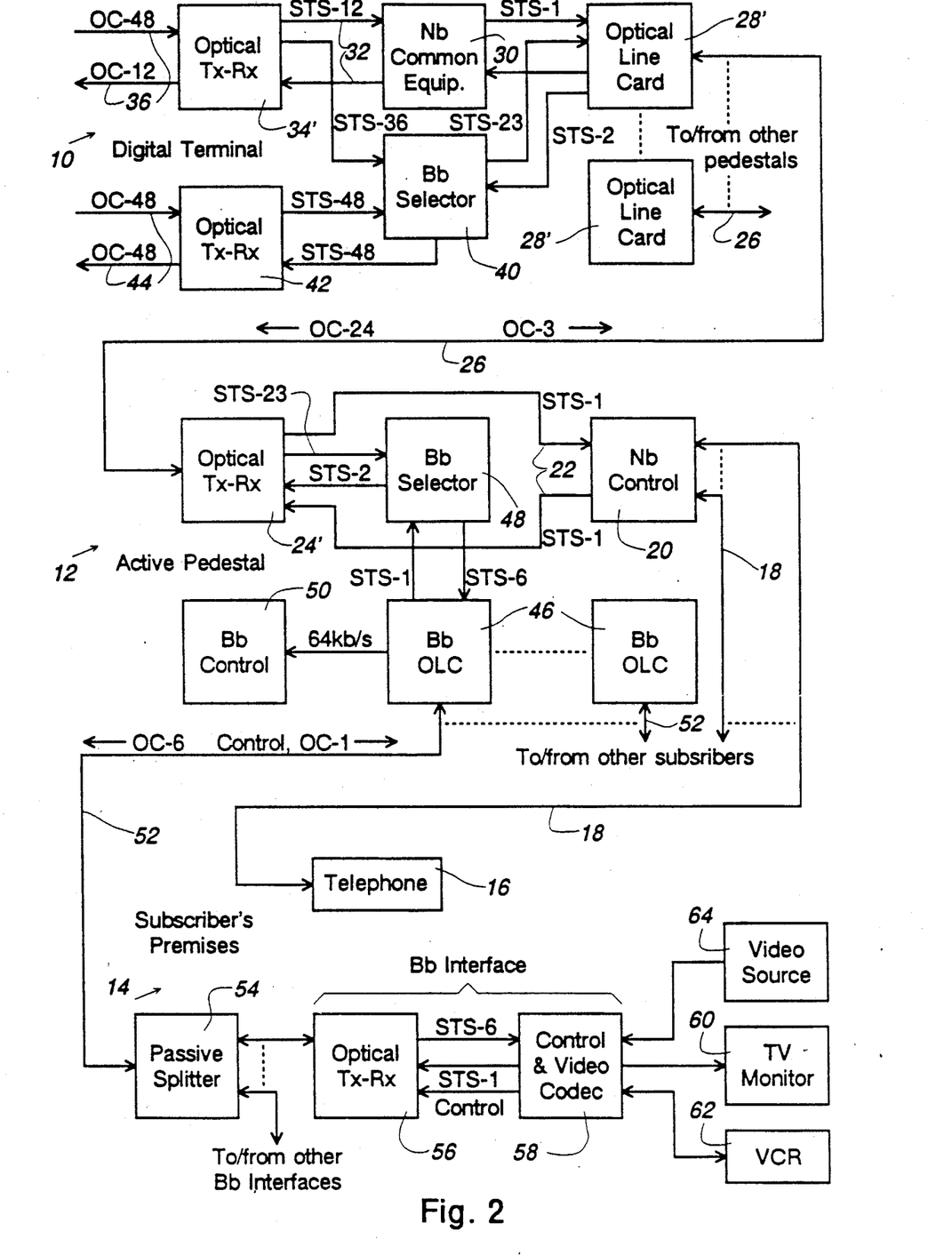
FIG. 2 is a block diagram illustrating a communications system in accordance with an embodiment of this invention.

FIG. 2 illustrates an upgraded communications system in accordance with an embodiment of this invention. In the network of FIG. 2, the same digital terminal 10, active pedestal 12, and subscriber's premises 14 exist, but the equipment in each case is upgraded to accommodate broadband (Bb) as well as narrowband services. This upgrading is effected in a manner which to a large extent makes use of the existing equipment as described above and shown in FIG. 1, so that it can be achieved in a convenient and cost-effective manner.

Referring to FIG. 2, in the digital terminal 10 the optical transmitter and receiver 34 of FIG. 1 is replaced by an upgraded optical transmitter and receiver 34' which receives an OC-48 signal and transmits an OC-12 signal via the existing fibers 36. Similarly, the optical line cards 28 in FIG. 1 are replaced by upgraded optical line cards 28' in FIG. 2, which transmit OC-24 signals in the downstream direction and receive OC-3 signals in the upstream direction on the existing optical fibers 26, again using WDM. The narrowband common equipment circuit 30 is retained, and a broadband selector circuit 40 is added. An additional OC-48 optical transmitter and receiver 42 can optionally be provided for coupling STS-48 signals to and from the circuit 40 for additional broadband services (e.g. video-on-demand services) carried on additional fibers 44, as described further below with reference to FIG. 3.

In the active pedestal 12, the optical transmitter and receiver 24 of FIG. 1 is replaced by an upgraded optical transmitter and receiver 24' which receives an OC-24 signal and transmits an OC-3 signal via the fiber 26. The narrowband control circuit 20 is retained with the same connections to the subscriber lines 18. In addition, the active pedestal 12 is provided with a broadband optical line card (Bb OLC) 46 for each subscriber 14, a broadband selector circuit 48, and a broadband control circuit 50. Each Bb OLC 46 is coupled to a respective optical fiber 52 leading to the respective subscriber's premises, and serves using WDM to transmit an OC-6 signal in the downstream direction on this fiber 52 and to receive in the upstream direction from this fiber 52 a low bit-rate control signal and, optionally, an OC-1 upstream signal. Each Bb OLC 46 supplies the control signal, for example having a bit rate of 64 kb/s as illustrated, to the control circuit 50 as described in greater detail below. As also described further below, for any of the subscribers the Bb OLC 46 and optical fiber 52 can be replaced by a coaxial cable interface and a coaxial cable to the subscriber's premises, for communicating electrical rather than optical signals.

In the subscriber's premises 14, the added optical fiber 52 is coupled via a passive optical splitter 54 to up to 6 broadband interface circuits, only one of which is shown, each of which comprises an optical transmitter and receiver 56 and a control and video decoder and optional coder circuit 58. The circuit 58 receives an STS-6 signal, corresponding to the downstream OC-6 signal on the fiber 52, from the optical transmitter and receiver 56 and decodes this for supply to one or more digital or analog television monitors 60 and video cassette recorders (VCRs) 62, and supplies to the optical transmitter and receiver 58 the control signal which it produces in dependence upon, for example, program selections by a subscriber. In addition, the circuit 58 may receive from an optional video source 64, or from the VCR 62, a video signal which it encodes and supplies as an STS-1 signal to the optical transmitter and receiver 56 to constitute the upstream OC-1 signal on the fiber 52.

In the digital terminal 10, the OC-48 optical signal received by the optical Tx-Rx 34' comprises, and is divided into, an STS-12 component which is the same as in the prior art arrangement of FIG. 1 and is supplied to the narrowband common equipment 30 in the same manner, and an STS-36 component which comprises 36 STS-1 channels, each for example consisting of an individual digital television channel. The STS-36 component is supplied to the broadband selector circuit 40. In a protected form of the equipment, the fibers 36 and the optical transmitter and receiver 34' are duplicated to provide active and standby telephony STS-12 signals either of which is used by the narrowband common equipment 30. As the broadband signals do not generally require similar protection, in this case two sets of STS-36 signals, providing a total of 72 STS-1 channels, are supplied to the broadband selector circuit 40.

As already indicated, the optical transmitter and receiver 42 may also be provided to supply a further 48 STS-1 channels to the broadband selector circuit 40. Two such units can be conveniently provided, enabling the broadband selector circuit 40 to be supplied in a downstream direction with a total of 168 STS-1 channels.

Each of the optical line cards 28' is supplied with an STS-23 signal, comprising any selected combination of STS-1 channels, from the broadband selector circuit 40, multiplexed (by a multiplexer not shown in FIG. 2) with the respective STS-1 signal which is supplied as in the prior art from the narrowband common equipment circuit 30. The optical line card 28' transmits the resulting STS-24 signal downstream as the OC-24 optical signal on the respective fiber 26.

In the upstream direction, each optical line card 28' receives a respective OC-3 signal, and from the corresponding STS-3 signal produces, via a demultiplexer not shown in FIG. 2, the STS-1 signal for the narrowband common equipment circuit 30 as in the prior art, and an STS-2 signal containing up to 2 STS-1 upstream channels which it supplies to the broadband selector circuit 40. These upstream channels can be switched by the broadband selector circuit 40 either to one of the optical transmitter and receivers 42 for further upstream transmission via a fiber 44, or to any of the optical line cards 28'.

The broadband selector circuit 40 thus can comprise an STS-1 channel selector having, assuming that there are 30 optical line cards 28', 168+30*2=228 STS-1 channel inputs and 30 sets of 23 STS-1 channel outputs, with appropriate demultiplexers and multiplexers and selection control circuitry. The selection control circuitry includes a memory including information as to which STS-1 channels are permitted (in accordance with any desired payment scheme, for example) to be supplied, and are currently supplied, to which subscribers and hence optical line cards 28'. Such information is updated using the overhead information in the upstream OC-3 optical signal, in a manner described in more detail below.

In a similar manner, in the active pedestal 12 the downstream received OC-24 signal is converted and demultiplexed into the STS-1 telephony signal, which is supplied to the narrowband control circuit 20, and an STS-23 signal which is supplied to the broadband selector circuit 48. The upstream STS-1 telephony signal supplied from the narrowband control circuit 20 is multiplexed with an upstream STS-2 signal discussed below and supplied to the optical transmitter and receiver 24', which transmits the corresponding upstream OC-3 optical signal on the fiber 26.

The broadband selector circuit 48 supplies to each of the Bb OLCs 46 and STS-6 signal comprising any selected combination of 6 STS-1 channels. This is transmitted downstream on the respective fiber 52 as an OC-6 signal to the respective subscriber. In the upstream direction, each Bb OLC 46 receives the control signal, which it supplies to the broadband control circuit 50, and also receives any upstream OC-1 signal which is transmitted on the fiber 52 from the subscriber's premises, supplying this as an STS-1 signal to the broadband selector circuit 48. As described in greater detail below, the upstream STS-1 signal from any subscriber can also be looped back by the broadband selector circuit 48 to constitute one of the 6 STS-1 signals which can be supplied downstream on the fiber 52 to the same subscriber, this being referred to as a local hairpin connection. The upstream STS-1 signals from any two of the subscribers can also be supplied as the STS-2 signal mentioned above, from the broadband selector circuit 48 to the optical transmitter and receiver 24', to be combined with the upstream STS-1 telephony signal and transmitted on the fiber 26 as part of its upstream OC-3 signal.

Although SONET OC-6 and OC-1 signals are referred to here as being carried by the fiber 52, it should be appreciated that the communications between the active pedestal 12 and each subscriber's premises 14 may not require full compatibility with the SONET standard, and accordingly certain parts of this standard (e.g. pointer processing) may be omitted for these optical signals and the equivalent electrical signals in order to reduce equipment costs. Furthermore, as described further below, these optical communications paths may alternatively be replaced by coaxial cable paths.

In the subscriber's premises 14, there may be up to 6 simultaneously active broadband interfaces 56, 58, one in respect of each of the possible 6 STS-1 channels contained in the downstream OC-6 signal, all supplied with this downstream signal via the passive optical splitter 54. Within the control and video codec circuit 58 of each broadband interface, up to two respective STS-1 signals are each selected and decoded to form video signals which are supplied to the television monitor 60 and/or VCR 62. An upstream video signal from the VCR 62 or video source 64 is conversely encoded into an STS-1 signal and can be transmitted upstream as the upstream OC-1 signal on the fiber 52; only one such upstream signal can be transmitted from any one subscriber's premises at one time.

As the upstream control signal has a low bit rate of for example 64 kb/s, whereas the upstream STS-1 signal has a much higher bit rate of 51.84 Mb/s, these two signals are frequency division multiplexed for transmission in the upstream direction. The control signal can be produced in any convenient manner, for example from a subscriber's selection signals produced by an infra-red television remote control unit and received by an infrared receiver which forms a part of the circuit 58.

Although as described above each video or television channel is assumed to be digitized in a respective STS-1 signal, this need not be the case. In particular, for HDTV signals each channel may be digitized in an STS-3 signal or a group of three STS-1 signals, which may accordingly be handled collectively by the communications system, the control and video codec circuit 58 then decoding the respective three STS-1 signals to recover the HDTV channel. Thus the system can conveniently accommodate six standard television channels, or three standard television channels and one HDTV channel, or two HDTV channels, for each subscriber.

Figure 3:
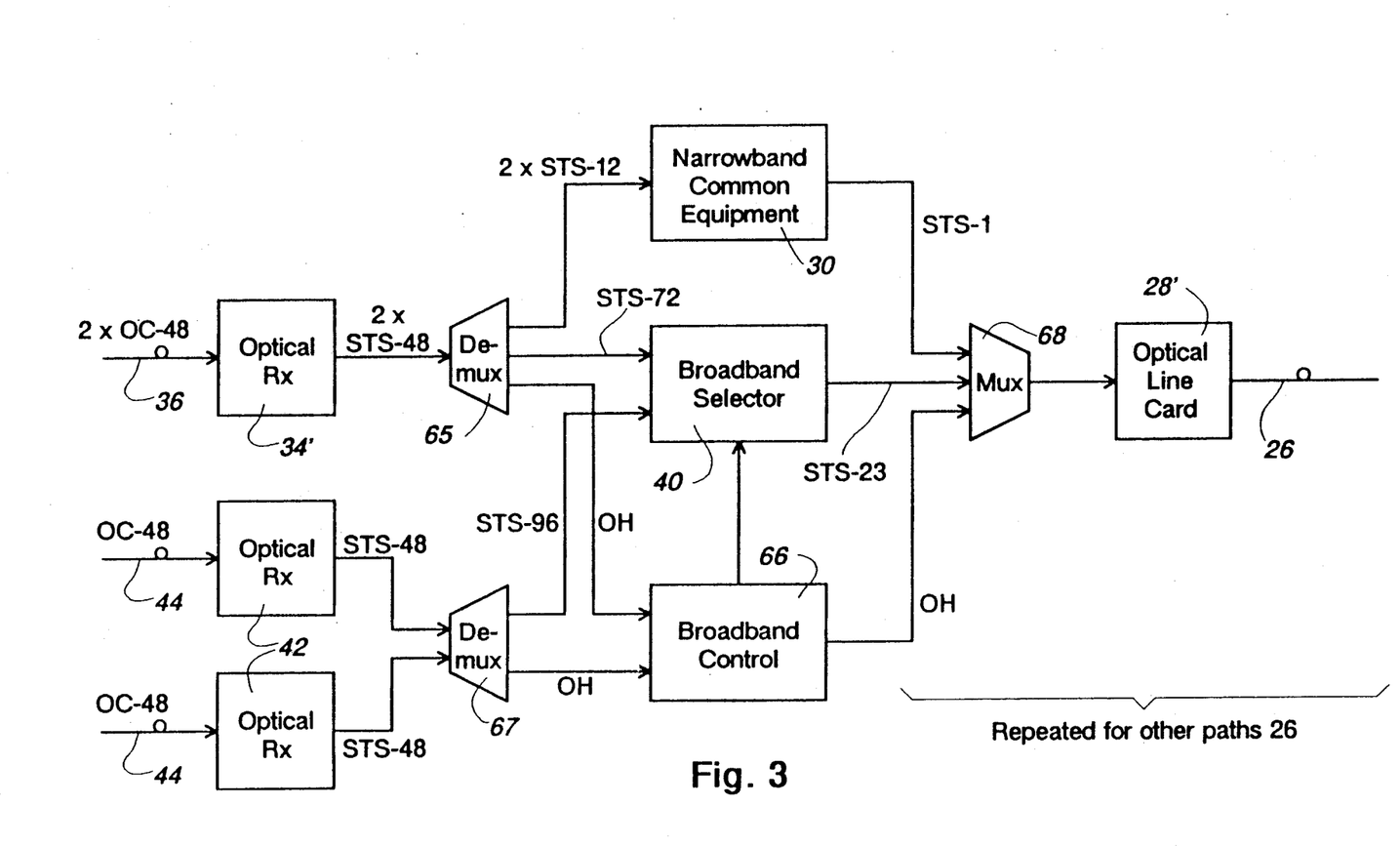
FIG. 3 is a block diagram illustrating parts of a digital terminal of the communications system of FIG. 2 in greater detail.

FIG. 3 illustrates in greater detail parts of the digital terminal 10, showing for simplicity only the downstream direction of communications; similar and corresponding provisions are made for handling the upstream control and signal communications.

Referring to FIG. 3, the optical receiver 34' receives in this case two OC-48 optical signals from the fibers 36, and supplies two corresponding STS-48 signals to a demultiplexer 65, which supplies two redundant STS-12 telephony signals to the narrowband common equipment 30, an STS-72 broadcast television channel signal to the broadband selector 40, and control information derived from the SONET overhead information OH to a broadband control unit 66. Similarly, two optical receivers 42 receive OC-48 signals from fibers 44 and produce two STS-48 signals which are supplied via a demultiplexer 67 to the broadband selector 40 as an STS-96 signal and as control information, derived from the SONET overhead information OH, to the broadband control unit 66.

For each optical line card 28' and associated fiber 26, of which only one is shown in FIG. 3, the digital terminal 10 includes a respective multiplexer 68 which multiplexes the respective telephony STS-1 signal from the narrowband common equipment 30, an STS-23 signal from the broadband selector 40, and control information from the broadband control unit 66 in the SONET overhead OH, to produce the downstream STS-24 signal which is transmitted by the optical line card 28' on the fiber 26.

By way of example, it is observed that the fibers 44 can carry either additional broadcast television channels or, more flexibly, narrowcast as well as or instead of broadcast television channels. By narrowcast channels is meant channels which are intended to be delivered to only one subscriber or to a small group of subscribers. Examples of such channels include video-on-demand services such as interactive video services, and individually selected movies which may be played on a central VCR and delivered at a desired time to an individual requesting subscriber. To facilitate the provision of such services, it should be appreciated that the fibers 44 can be supplied with signals from a video or broadband switch (not shown), which is similarly controlled via the SONET overhead information to provide video or broadband switched connections from service providers to these fibers.

Figure 4:
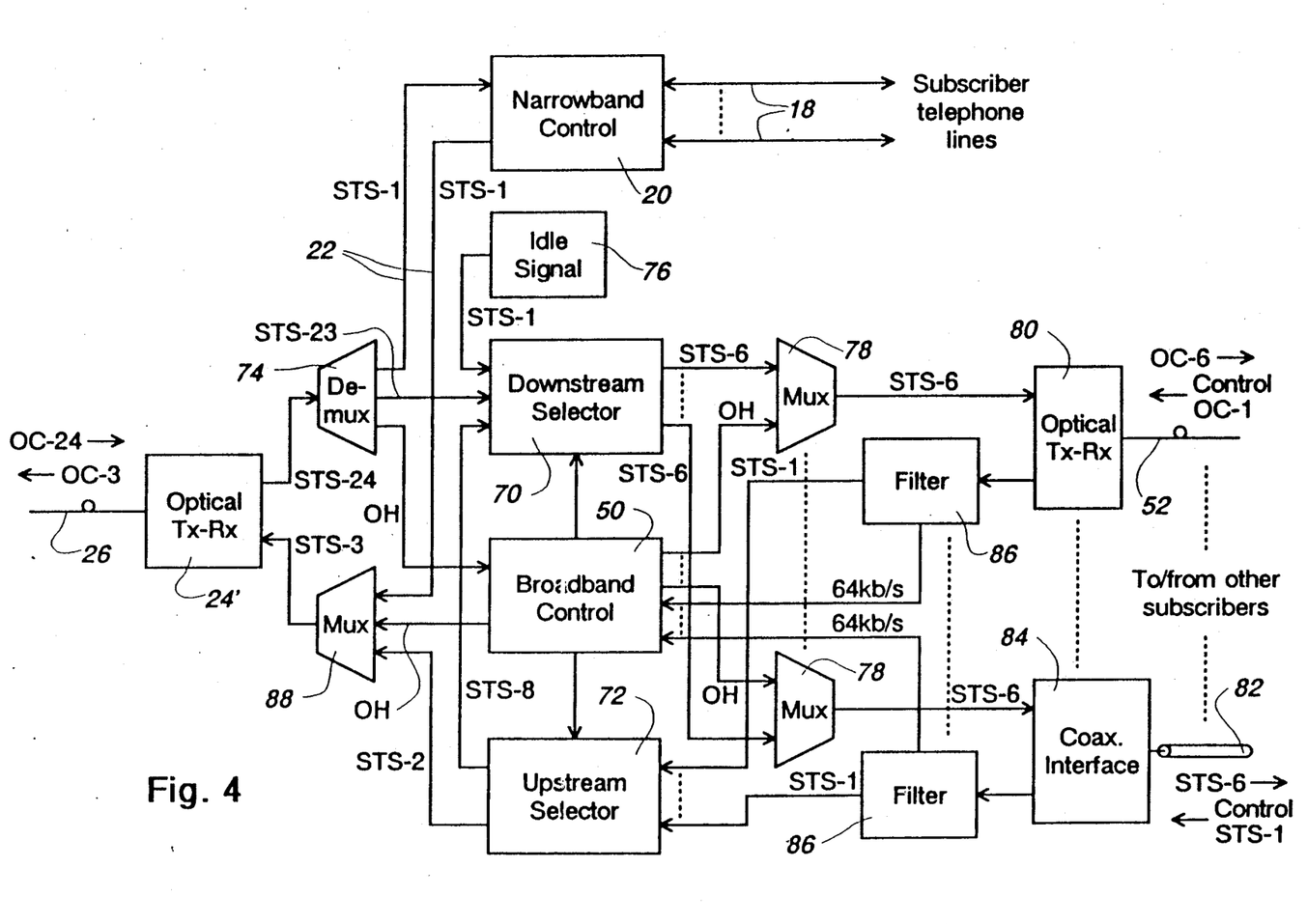
FIG. 4 is a block diagram illustrating an active pedestal of the communications system of FIG. 2 in greater detail.

FIG. 4 illustrates the active pedestal 12 in greater detail. As shown in FIG. 4, the broadband selector circuit comprises a downstream selector 70 and an upstream selector 72, both of which are controlled by the broadband control circuit 50. The downstream OC-24 signal on the fiber 26 received by the optical transmitter and receiver 24' is supplied as an STS-24 signal to a demultiplexer 74, which supplies a demultiplexed STS-23 payload signal to the downstream selector 70, the downstream STS-1 telephony signal to the narrowband control circuit 20, and overhead (OH) information to the control circuit 50. The downstream selector 70 is also supplied with an STS-8 signal from the upstream selector 72 to provide for hairpin connections, and an STS-1 idle signal from a generator 76 to insert into unused signal channels.

The downstream selector 70 has 8 outputs, only 2 of which are shown in FIG. 4, each for an STS-6 payload signal comprising the 6 STS-1 components or channels selected by the respective one of the 8 subscribers. These outputs are coupled to respective multiplexers 78, which are also supplied with overhead information from the broadband control circuit 50 and produce STS-6 signals at their outputs. As shown for the upper subscriber output in FIG. 3, the STS-6 signal is supplied to an optical transmitter and receiver 80, forming part of the Bb OLC 46 in FIG. 2, which transmits the corresponding OC-6 optical signal in the downstream direction on the fiber 52. As an alternative arrangement as shown for the lower subscriber output in FIG. 4, instead of the optical fiber 52 and associated optical transmitter and receiver 80, a coaxial cable 82 and coaxial cable interface 84 can be provided for transmitting and receiving the electrical signals. Different such arrangements can be provided for different subscribers. It should be appreciated that in a similar manner a coaxial cable interface can be provided at other points between the pedestal and the broadband interfaces in the subscribers' premises, so that signals are carried partly optically and partly via coaxial cable, with the optical transmitter and receiver 56 in the broadband interface being replaced by a coaxial cable interface.

In the upstream direction, for each subscriber the frequency division multiplexed upstream STS-1 signal and control signal produced by the optical transmitter and receiver 80 or coaxial cable interface 84 are separated by a filter 86, which supplies the 64 kb/s control signal to the broadband control circuit 50 and the STS-1 signal to the upstream selector 72. The 8 STS-1 signals so received by the upstream selector 72 are supplied as the STS-8 signal to the downstream selector 70 as already described, and any 2 of them are combined to form an STS-2 signal which is supplied to a multiplexer 88. The multiplexer 88 is also supplied with overhead information from the broadband control circuit 50 and with the upstream STS-1 telephony signal from the narrowband control circuit 20, and combines these signals to produce the upstream STS-3 signal which is transmitted as the OC-3 signal on the fiber 26 by the optical transmitter and receiver 24'.

The broadband control circuit 50 contains a memory which stores a provisioning map for each subscriber and each transmission direction, in accordance with which it controls the downstream selector 70 and the upstream selector 72. The circuit further includes a micro-controller and control ROM, in accordance with which the selectors 70 and 72 are controlled in known manner. The micro-controller also handles in known manner communications with the digital terminal 10 via the overhead information OH on the upstream OC-3 and downstream OC-24 signals, and with the control circuits 58 in each subscriber's premises 14 via the overhead information OH in the downstream OC-6 signals and via the 64 kb/s control channel in the upstream direction. In order to handle contention among different subscribers, the control channel communications are effected either in accordance with polling by the broadband control circuit 50 or using TDMA (time division multiple access) techniques which are known in themselves.

By way of example, the control channel communications can be a TDMA scheme in which the 64 kb/s channel is subdivided into eight 8 kb/s time channels, the first six of which are used for 16-byte selection control messages from the six broadband interfaces of each subscriber's premises. The seventh such time channel can be used for hairpin connection requests, in accordance with which the broadband control circuit 50 controls the downstream selector 70 to supply as one of the channels in the OC-6 downstream signal the signal contained in the upstream OC-1 signal of the same subscriber. Thus a video signal which is available at one of the broadband interfaces in a subscriber's premises can be distributed to any other broadband interface in that subscriber's premises, under the subscriber's control and without involvement of the digital terminal 10. The eighth such time channel can be used for a handshaking signal on power-up of any of the broadband interfaces, before it is allocated one of the first six time channels.

Also by way of example, the provisioning map in the memory of the broadband control circuit 50 can include a table of downstream input to output port assignments, storing for each of the 48 STS-1 output channels (an STS-6 signal for each of 8 subscribers) a number indicating which STS-1 channel incoming to the downstream selector 70 is assigned to that port. In addition, this map can contain a table containing the identity of each of the 23 STS-1 video channels contained in the downstream OC-24 signal on the fiber 26, referred to as a bearer identity. Furthermore, the provisioning map can contain a status table for each of the 48 broadband interfaces in the subscribers' premises, storing in each case the bearer identity for that interface or an indication that the interface is inactive (i.e. provisioned but unpowered) or is not provisioned.

The provisioning map in the memory of the broadband control circuit 50 in the active pedestal 12 is downloaded, and can be updated, from similar information contained in a map in the broadband control unit 66 in the digital terminal 10, which in turn is maintained and updated from an administration center (not shown) and in accordance with requests from the respective subscribers. As already indicated, communications to and from these control units are provided via the 64 kb/s upstream control channel from the subscribers' premises to the active pedestals, and otherwise via the overhead information OH on the various SONET signal paths. The 64 kb/s upstream control channel is used from each subscriber's premises to the associated active pedestal because the upstream broadband channel is optional; the overhead information on such an upstream channel could alternatively be used where this is available.

Communications, such as program channel requuests, originated by a subscriber are conducted via the upstream control channel and via the active pedestal 12 to the broadband control unit 66 in the digital terminal, without any change in the provisioning at the active pedestal. For example, a subscriber's request for a particular broadcast television channel available as one of the channels on the fibers 36 is passed via the upstream control channel to the broadband control unit 66, which controls the broadband selector circuit 40 to supply the requested channel to the downstream channel or bearer which is allocated, in accordance with the stored provisioning maps, to the subscriber's broadband interface 56, 58 from which the request originated. As the broadband selector 48 in the active pedestal 12 is controlled in accordance with the stored provisioning map to couple the respective bearer channel to the respective subscriber's broadband interface, no real-time switching takes place within the active pedestal 12.

The above comments assume that the particular broadband interface 56, 58 is already active and has a bearer channel allocated to it. Initially, on powering up the broadband interface, this is not the case. In this situation the broadband interface communicates via the eighth TDMA time channel referred to above, indicating that it requires a bearer channel to be assigned to it. In response to such an indication, the broadband control unit 66 updates its provisioning map and that in the broadband control circuit 50 of the active pedestal 12, allocating a respective bearer for the broadband interface 56, 58, and assigns to the broadband interface a free one of the first six TDMA time channels for further communications. In this manner, contention among different broadband interfaces in a subscriber's premises is avoided, except on initial power-up of two or more interfaces simultaneously.

In the event that a broadband interface 56, 58 wishes to be allocated two video channels simultaneously, for example for viewing one and recording another, then the broadband interface is allocated two bearer channels each in the same manner as described above.

For specific program channels, for example for the channels carried by the fibers 44, the broadband control unit 66 in the digital terminal may contain further maps, updated by the administration center or program channel provider, indicating whether or not individual subscribers are authorized to receive such channels, storing access codes which are to be supplied by a subscriber to gain access and instigate billing for a program, and so on. Verification of a subscriber's entitlement to receive a channel is then effected by the broadband control unit 66 before the broadband selector 40 is controlled to supply the requested channel. It should be appreciated that, subject to such verification, the broadband selector 40 is controlled to supply both broadcast and narrowcast channels to a subscriber in the same manner.

From the foregoing description it should also be appreciated that the invention enables existing communications facilities, such as conventional narrowband active pedestal equipment and telephone subscriber lines, to be utilized in an upgraded environment which also provides broadband services, thereby reducing the costs of upgrading. While optical fiber paths 52 are desirably provided between the active pedestal 12 and the subscribers' premises, as described above coaxial cables 82 may be used instead, and to this end already existing coaxial cables may also be used to further reduce costs.

In addition, because the digital terminal 10 performs the communications and switching functions in the upgraded arrangement described above, the arrangement may conveniently be further upgraded by incorporating the functions of the active pedestal 12 within the digital terminal, without modification of the subscribers' premises equipment.

Although a particular embodiment of the invention has been described in detail above, it should be appreciated that many changes may be made, in particular in relation to the signal formats used and the numbers of signal channels on each communication path, active pedestals per digital terminal, and subscribers per active pedestal. Numerous other modifications, variations, and adaptations may be made to the described embodiment without departing from the scope of the invention as defined in the claims.

What is claimed is:

1. A communications system comprising a digital terminal (10), at least one active pedestal (12) coupled to the digital terminal via a first, bidirectional, communications path (26), and a plurality of subscribers' premises (14) each coupled to the active pedestal via a respective telephone line (18) and via a respective second communications path (52, 82);

the digital terminal comprising:

means (68) for multiplexing a plurality of broadband signal components with a multiplexed telephony signal and for transmitting the resulting multiplexed signal via the first communications path to the active pedestal;

means (28') for receiving a multiplexed telephony signal and control signals via the first communications path from the active pedestal; and means (40, 66) for selecting the broadband signal components in dependence upon the control signals;

and the active pedestal comprising:

means (24', 74) for receiving and demultiplexing the multiplexed signal from the first communications path;

means (50) for receiving control signals from each subscriber;

means (88, 24') for transmitting multiplexed telephony signals and the control signals via the first communications path;

coupling means (20) for coupling the received and transmitted telephony signals to and from the telephone lines for providing telephone communications via the lines; and means (70) for coupling the broadband signal components to the second communications paths.

2. A communications system as claimed in claim 1 wherein the means (50) for receiving control signals from each subscriber comprises means for receiving the control signals via the respective second communications path.

3. A communications system as claimed in claim 1 wherein the first communications path comprises an optical communications path.

4. A communications system as claimed in claim 2 wherein the first and second communications paths comprise optical communications paths.

5. A communications system as claimed in claim 1 wherein the active pedestal further includes means (80, 84) for receiving a broadband signal component via each respective second communications path and means (72) for supplying the received broadband signal component to the means for coupling broadband signal component to the second communications paths.

6. A communications system as claimed in claim 5 wherein the means (50) for receiving control signals from each subscriber is responsive to the control signals for controlling the means (70) for coupling the broadband signal components to the second communications paths to couple to the same respective second communications path the broadband signal component received via each respective second communications path.

7. A communications system comprising a digital terminal (10), an active pedestal (12) coupled to the digital terminal via a first, bidirectional, communications path (26), and, for each of a plurality of subscribers, a telephone line (18) and a second communications path (52, 82) coupled between the active pedestal and the respective subscriber's premises;

wherein the digital terminal comprises means (28') for receiving a multiplexed telephony signal and control signals from the active pedestal via the first communications path, means (40) for selecting broadband signal components in dependence upon the control signals, and means (68, 28') for transmitting the selected broadband signal components and a multiplexed telephony signal to the active pedestal via the first communications path;

and wherein the active pedestal comprises means (20) for coupling telephony signals between each telephone line and the first communications path to provide telephone communications via the telephone lines and the multiplexed telephony signals on the first communications path, means (46, 48) for coupling components of the broadband signal received via the first communications path to the second communications paths for delivery of the components to respective subscribers' premises, and means (50, 88) for communicating control signals, for selecting broadband signal components, from each subscriber's premises to the digital terminal multiplexed with the telephony signal on the first communications path.

8. A communications system as claimed in claim 7 wherein the means (46, 48) for coupling components of the broadband signal received via the first communications path to the second communications paths for delivery of broadband signal components to each subscriber's premises comprises means (70) for selecting broadband signal components in dependence upon control signals from the respective subscriber's premises.

9. A communications system as claimed in claim 8 wherein the second communications paths comprise bidirectional communications paths and the active pedestal further comprises means (80, 84) for receiving a broadband signal component via a second communications path.

10. A communications system as claimed in claim 9 wherein the active pedestal includes means (72, 88) for supplying a broadband signal component received via one of the second communications paths to the digital terminal via the first communications path.

11. A communications system as claimed in claim 9 wherein the active pedestal includes means (72) for supplying a broadband signal component received via one of the second communications paths to the means for selecting broadband signal components in dependence upon control signals from the respective subscriber's premises.

12. A communications system as claimed in claim 11 wherein the first and second communications paths comprise optical communications paths.

* * * * *

UNITED STATES PATENT AND TRADEMARK OFFICE
CERTIFICATE OF CORRECTION

PATENT NO. : 5,029,333

DATED : July 2, 1991

INVENTOR(S) : Alan Frank GRAVES, Valerie Anne VAN ALSTINE,
Barry Benjamin HAGGLUND and Ronald George WELLARD It is certified that error appears in the above-identified patent and that said Letters Patent is hereby corrected as shown below: Title page:

Item (75) fourth -named inventor should read-- George WELLARD --. which was omitted from the Patent Grant.

Signed and Sealed this

Twenty-ninth Day of September, 1992

Attest:

DOUGLAS B. COMER

*Attesting Officer*  *Acting Commissioner of Patents and Trademarks*